Figure 1:
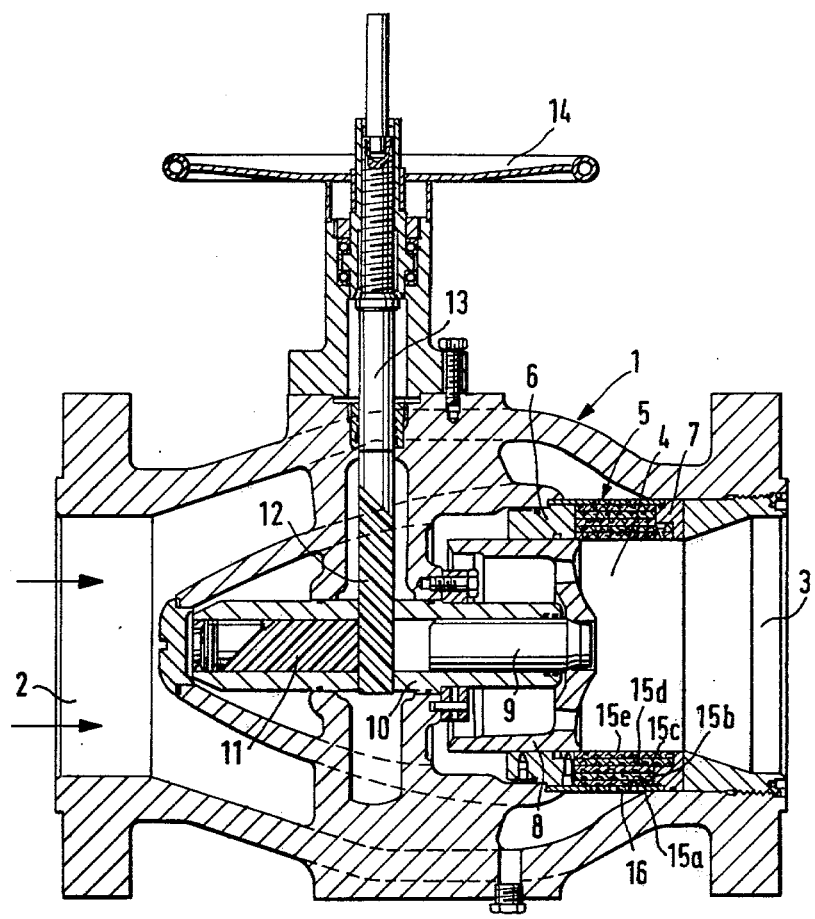

United States Patent [19]

Weevers

[11] 4,327,757
[45] May 4, 1982

[54] CONTROL VALVE

[75] Inventor: Henri H. Weevers, Gouda, Netherlands

[73] Assignee: Machinefabriek Mokveld B.V., Gouda, Netherlands

[21] Appl. No.: 167,476

[22] Filed: Jul. 11, 1980

[30] Foreign Application Priority Data

Jul. 20, 1979 [DE] Fed. Rep. of Germany ....... 2929389

[51] Int. Cl.³ .............................................. F16K 47/14
[52] U.S. Cl. ............................ 137/625.3; 137/625.37; 137/219; 251/127
[58] Field of Search ................ 137/625.3, 625.37, 219; 251/127

[56] References Cited

U.S. PATENT DOCUMENTS 3,917,221  11/1975  Kubota et al. ........................ 251/127
3,954,124  5/1976  Self ................................ 137/625.3 X
4,218,041  8/1980  Bernat ................................ 251/127

FOREIGN PATENT DOCUMENTS 2514879  10/1976  Fed. Rep. of Germany ... 137/625.3

Primary Examiner—Arnold Rosenthal
Attorney, Agent, or Firm—W. G. Fasse; D. F. Gould

[57] ABSTRACT

A fluid control valve is equipped with a plurality of sleeves nested one within the other to form a cage for pressure reduction between the inlet and outlet ports of the valve housing. Each sleeve is provided with blind bores, through-bores and interconnecting grooves which cooperate to repeatedly divide the flow into more and more partial flows which keep colliding with one another. Volume control is achieved by a slidable piston cooperating with the cage.

5 Claims, 2 Drawing Figures

CONTROL VALVE

BACKGROUND OF THE INVENTION

The invention relates to a flow control valve having a shut-off body constructed as a piston arranged so as to be displaceable inside a cage. The cage comprises several hollow cylindrical cage pipes which are nested in one another in a liquid-tight manner and in a concentric arrangement. These cage pipes have bores therein which are connected to bores in adjacent cage pipes.

In the case of control valves, if only a single resistance were to be arranged in the flow path, the pressure to be reduced from the input pressure $p_1$ by the pressure difference $\Delta p$ to the output pressure $p_2$ would in the meantime sink by a considerably greater amount than $\Delta p$ and would thus accordingly drop below the desired output pressure $p_2$. Apart from the fact that in the region of the least pressure the medium is subjected to a very high acceleration and thus assumes such high speeds that erosions are promoted. Under such operating conditions there is also the danger that the region of the least pressure passes into the vapor pressure zone or comes too close to this zone, whereby cavitation occurs.

Therefore, in know control valves, the labyrinth principle is used to reduce the pressure of a flowing medium. According to the labyrinth principle several resistances are arranged in series in the flow path, so that each resistance brings about an acceleration of the flowing medium and a corresponding pressure drop in smaller stages. The partial raising again of the pressure in the flow direction behind the resistances is effected in correspondingly small stages. Erosion and cavitation may be avoided by means of such a pressure reduction carried out in stages if, depending on the magnitude of $\Delta p$, an adequate number of resistances is arranged in series.

However, the labyrinth system can be used only to a limited extent in the case of high pressure control valves, since a large number of resistances connected in series leads to a correspondingly large valve structure. Large valves entail large production expenditures, and make their maintenance more expensive, all the more so since corresponding cross-sectional constrictions of the resistances in the individual flow channels enhance the risk of clogging.

Known control valves for high pressures have a displaceably constructed shut-off body mounted in a housing having an inlet, an outlet, and a valve chamber arranged therebetween. A cage having a hollow cylindrical shape is located in the valve chamber. The displaceable shut-off body extends to a larger or smaller extent into the interior of the cage. It has been proposed heretofore to compose the cage for such a control valve of numerous hollow cylindrical cage pipes or sleeves, please see German Patent Publication (DE-OS) No. 2,439,583. In said prior art valve the cage pipes have correspondingly different diameters and are nested in one another in a liquid-tight manner and in a concentric arrangement. Numerous openings are formed in each cage unit. The openings communicate with corresponding openings in an adjacent cage unit.

The flow medium passes in the case of the known valve successively through the cage sleeves so that its pressure is successively reduced in many stages and a high pressure difference or pressure drop, for example, between the pressure of the medium in the interior of the cage and the pressure of the medium outside of the cage may be achieved. Since this pressure drop is achieved successively in stages, a pressure reduction region having a locally large pressure drop can be avoided whereby the danger of cavitation is substantially precluded, so that also no erosion occurs.

However, a disadvantage of the prior art valve consists in that, for a high pressure difference, a large number of cage sleeves nested one in the other is needed, whereby the known valve becomes correspondingly involved and expensive.

OBJECTS OF THE INVENTION

In view of the above it is the aim of the invention to achieve the following objects singly or in combination:

to construct a control valve of the kind described above in such a way that the largest possible number of pressure reduction stages may be achieved with the least possible number of nested cage sleeves;

to cause repeated pressure reduction steps in the same cage sleeve, whereby partial flows repeatedly collide with one another;

to reduce the flow speed by a combination of friction effects and repeated flow collisions;

to assure an optimal pressure reduction by a valve construction permitting a high mean flow speed;

to provide an efficient flow control valve suitable for liquid and/or gaseous media;

to reduce as much as possible the generation of noise normally resulting in conventional control valves; and to avoid the occurrence of pressures corresponding to the vapor pressure of the particular medium.

SUMMARY OF THE INVENTION

In accordance with the invention the present fluid control valve is characterized in that the cage sleeves are provided, in addition to the pairs of through-bores, with pairs of blind or dead end bores. The pairs of through-bores and the pairs of blind or dead end bores of the same cage sleeve communicate with one another through peripheral or circumferential grooves. The pairs of through-bores of one cage sleeve register at least partially with the pairs of blind bores of the adjacent cage sleeve.

As a result of the arrangement, in accordance with the invention, of pairs of blind bores adjacent to pairs of through-bores, medium partial flows may be so channelled that they are repeatedly split up again inside a cage sleeve and these partial flows repeatedly collide with one another before the medium partial flows reach the through-bores and blind bores of the following cage sleeve in which again further multiple pressure reductions are effected. Thus, the speed of the medium partial flow is reduced not only as a result of the friction which is converted into heat in the flow paths, but more especially also by the constantly repeated collisions of the medium partial flows.

In accordance with a particularly advantageous embodiment of the control valve according to the invention, the blind bores of one pair of blind bores are interconnected in such a way by a peripheral groove that medium flows from the two blind bores collide and flow apart to both sides of the pair of blind bores, in order to collide again with medium partial flows from adjacent pairs of blind bores. These collisions occur where pairs of bores which penetrate the cage sleeve, are arranged in such a way that the colliding medium partial flows are split up again. Their partial flows then pass through the bores which penetrate the cage sleeve and into blind bores of an adjacent cage aligned with the pass through bores in order to collide again with other partial flows in the groove or grooves of the next adjacent cage.

BRIEF FIGURE DESCRIPTION

Figure 2:
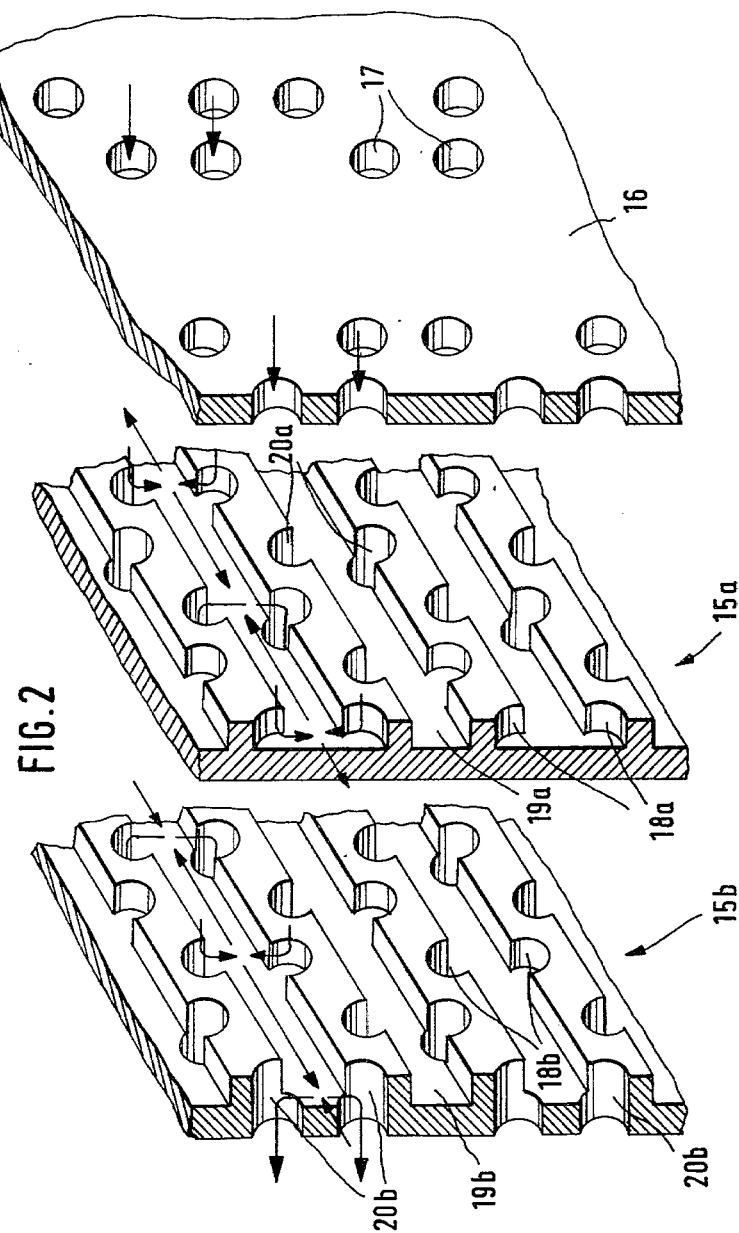

In order that the invention may be clearly understood, it will now be described, by way of example, with reference to the accompanying drawings, wherein:

FIG. 1 shows a cross-section through a control valve according to the invention; and FIG. 2 shows, on an enlarged scale relative to FIG. 1, an exploded, perspective view of partial pieces of three consecutive cage sleeves in section.

DETAILED DESCRIPTION OF PREFERRED EXAMPLE EMBODIMENTS AND OF THE BEST MODE OF THE INVENTION

As shown in FIG. 1, the present control valve comprises a valve housing 1 with an inlet port 2, an outlet port 3 and a valve chamber 4, which communicates directly with the outlet port.

A cage 5 is arranged concentrically inside the valve chamber 4. The cage 5 is held in a fixed position, at its two end faces, by rings 6 and 7.

A piston 8 is mounted so as to be displaceable coaxially relative to the cage 5. The piston 8 is secured to a piston rod 9 which is coaxially movable in a bushing 10.

The piston 8 may be moved into and out of the cage 5 by means of a rack 11 provided with helical gear teeth cooperating with respective gear teeth bulges on a spindle 13 which is mounted perpendicularly to the longitudinal axis of the valve housing 1. The spindle 13 may be rotated by means of a handwheel 14 which is secured to the free end of the spindle 13. The extent of piston movement into or out of the cage 5 to a greater or lesser extent may thus be precisely controlled.

The cage 5 comprises five concentrically arranged cage sleeves 15a, 15b, 15c, 15d, 15e which are nested in one another in liquid-tight manner, and a cage jacket 16 which surrounds the cage sleeves 15.

Through-bores 17 in the cage jacket 16 register in pairs with blind bores 18a of the outer cage sleeve 15a, as is particularly shown in FIG. 2. The blind bores 18a are correspondingly arranged in pairs and are interconnected by a peripheral groove 19a which has the same depth as the blind bores 18a. The peripheral groove 19a leads, on both sides of the pair of blind bores 18a, to adjacent through-bores 20a which are similarly interconnected in pairs by the peripheral groove 19a and which penetrate the cage sleeve 15a and are in turn in alignment or register with the blind bores 18b arranged in pairs in the sleeve 15b. These blind bores 18b are in turn interconnected by peripheral groove 19b which leads on both sides of the pair of blind bores 18b to pairs of bores 20b which extend through the cage sleeve 15b. From the above description it will be noted that the arrangement and construction of the throughbores, blind bores, and peripheral grooves are repeated in each of the cage sleeves in accordance with the pattern described for the sleeve 15a. Thus, the cage sleeves 15a, 15b, 15c, 15d, and 15e have, apart from their differences in diameter, the same configuration.

In operation, and assuming a flow direction as indicated by the arrows in FIGS. 1 and 2, the medium passes, depending on the position of the piston 8, through a larger or smaller number of bores 17 of the cage jacket 16, into the blind bores 18a. The medium flows are deflected in the blind bores through 90° and encounter one another inside the peripheral groove 19a interconnecting the blind bores directly in pairs. The resulting partial flows are conducted along the peripheral groove 19a to throughbores 20a, encounter partial flows flowing in the opposite direction from adjacent pairs of blind bores 18a and pass through the throughbores 20a which are arranged in the collision region. In other words, collisions occur at half the distance between adjacent pairs of blind bores 18a. The medium flows through the through-bores 19a to pairs of blind bores 18b in the following cage sleeve 15b, and from there, by way of peripheral, circumferential grooves 19b to pairs of through-bores 20b and, while undergoing renewed collisions with one another and splitting up. Finally, the flow reaches the interior of the valve chamber 4 through the through-bores 20e. From the chamber 4 the flow passes through the outlet port 3 into a pipeline system which is not shown.

The control valve in accordance with the invention is suitable for a wide range of applications and has a high dynamic stability while working with a desirable low noise level. The present valve has a wide working range, is insensitive to wear and therefore requires little maintenance. The control valve in accordance with the invention may, with comparatively small dimensions and with a limited number of nested cage sleeves realize a large number of pressure reducing stages arranged in series, since inside each cage sleeve repeatedly partial flows collide with one another perpendicularly, before they are passed on to the next cage sleeve.

As a result of the construction in accordance with the invention, medium flows pass in any event, irrespective of whether the flow direction is effected from the center of the cage outwardly or from the outside toward the center of the cage, initially through pairs of bores which are in alignment with pairs of blind bores. In the blind bores the medium flows are deflected through 90° and collide perpendicularly in the peripheral grooves connecting the blind bores of the pair of blind bores and are split up into medium partial flows by the peripheral groove extending on both sides of the pair of blind bores. The medium partial flows collide in turn perpendicularly with medium partial flows of adjacent pairs of blind bores and pass, from the collision point into bores of a pair of through-bores in the respective cage sleeve which register with blind bores of the next adjacent cage sleeve. Such flow pattern is repeated in each cage sleeve.

A high mean flow speed may be accomplished in a control valve according to the invention, whereby a correspondingly great pressure reduction can be achieved. Thus, a cage of a relatively small dimension with a comparatively low number of nested cage sleeves may be used which in turn positively affects the production and maintenance costs. This structure assures further that no pressure stage approaches the vapor pressure. No gaps or cracks are necessary for the collision of the partial flows, so that the danger of clogging is slight.

Basically, the control valve in accordance with the invention can be used to regulate liquid media or gaseous media. In connection with gases and vapors the expansion due to pressure reduction has to be taken into account.

Finally, as a result of tests it could be shown that with the present control valve the sound level, as compared with conventional valves, may be reduced considerably, since only a very small proportion of the mechanical energy of the flow medium is converted into acoustic energy.

Although the invention has been described with reference to specific example embodiments, it is to be understood, that it is intended to cover all modifications and equivalents within the scope of the appended claims.

What is claimed is:

1. A control valve for regulating the pressure of a fluid flow, comprising valve housing means having an inlet port and an outlet port, flow passage means operatively interconnecting said inlet and outlet ports, flow impedance means operatively located in said flow passage means, valve closure means operatively arranged in said valve housing means for cooperation with said flow impedance means for opening and closing said flow passage means, said flow impedance means comprising a plurality of hollow cylindrical sleeves nested one in the other in a liquid-tight manner, said sleeves (15) comprising a plurality of circumferential grooves (19), pairs of through-bores (20) and pairs of blind bores (18) arranged in alternating succession along the respective circumferential groove, each circumferential groove operatively interconnecting the through-bores and blind bores arranged alongside the respective groove, said sleeves being arranged relative to one another in such positions that the through-bores in one sleeve register at least partially with the blind bores in the next adjacent sleeve so that fluids flowing into the blind bores forming a pair collide with each other in the groove to thereby flow apart again in opposite directions in the respective groove on both sides of the pair of blind bores (18) for further colliding between the through-bores of the next adjacent pair of through bores with fluid flows coming from adjacent pairs of blind bores (18).

2. The control valve of claim 1, wherein the through-bores (20) of a pair of through-bores penetrating the sleeve means are so arranged opposite each other and between adjacent pairs of blind bores that the colliding fluid flows are further divided for flowing through the through-bores, and wherein the fluid flows which pass through the through-bores again enter into blind bores of the next sleeve for repeated colliding and separating.

3. The control valve of claim 1 or 2, wherein the blind bores of the pairs of blind bores (18) are deeper than the corresponding groove (19).

4. The control valve of claim 1 or 2, wherein said through-bores and said blind bores have open sides, and wherein the through-bores of a pair and the blind bores of a pair are respectively arranged opposite each other to face each other across the respective groove with the open sides communicating with the respective groove (19) for causing alternately opposite circumferentially directed flow components along each groove and substantially radially directed flow components through the through-bores.

5. The control valve of claim 4, wherein flow components coming radially through the through-bores are converted into said circumferentially directed flow components, by the blind bores and wherein flow components coming circumferentially in the grooves are converted again into radially directed flow components by the through-bores registering with respective blind bores.

* * * * *